United States Patent
Imamura et al.

(10) Patent No.: US 6,921,426 B2
(45) Date of Patent: Jul. 26, 2005

(54) PROCESS OF RECOVERING COPPER FROM ORE

(75) Inventors: Masaki Imamura, Ehime-ken (JP); Hideyuki Okamoto, Ehime-ken (JP); Iichi Nakamura, Tokyo (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 87 days.

(21) Appl. No.: 10/434,816

(22) Filed: May 9, 2003

(65) Prior Publication Data

US 2003/0230171 A1 Dec. 18, 2003

(30) Foreign Application Priority Data

May 10, 2002 (JP) ........................................ 2002-135657

(51) Int. Cl.[7] .............................................. C22B 15/08
(52) U.S. Cl. ............................................ 75/712; 423/41
(58) Field of Search .......................... 75/712, 412, 727; 423/41

(56) References Cited

U.S. PATENT DOCUMENTS 4,091,070 A * 5/1978 Riggs et al. .................. 423/41
5,698,170 A 12/1997 King

* cited by examiner

*Primary Examiner*—Melvyn Andrews
(74) *Attorney, Agent, or Firm*—Katten Muchin Rosenman LLP

(57) ABSTRACT

A copper concentrate obtained by flotation of a high grade copper ore containing chalcopyrite as a main mineral constituent is leached at a temperature of 100° C. or higher, and under a pressure greater than atmospheric pressure yielding a copper leachate containing ferric ions of at least 5 g/L and sulfuric acid, and this copper leachate is used in heap leaching or vat leaching of a low grade copper ore, whereby a method of recovering copper economically from a material containing copper is provided.

9 Claims, 4 Drawing Sheets

PROCESS OF RECOVERING COPPER FROM ORE

BACKGROUND OF THE INVENTION

1. Field of the Invention

The present invention relates to a process for recovering copper from ore, which contains chalcopyrite as a main copper mineral, efficiently with low cost at a mine site.

2. Description of the Prior Art

Copper smelting normally treats a copper concentrate containing copper grade of 20 to 35 wt % and obtained by physical separation process like flotation or gravity concentration from the copper ore, which comprises several copper minerals such as chalcopyrite, chalcocite or bornite or the like.

Pyromotallurgical process is the primary method used to treat copper concentrate, but in the case of uneconomical condition to apply the physical separation process for low grade sulfide ore or oxide ore, hydrometallurgical process is used to produce copper from the ore directly.

Pyrometallurgical process consist of two unit process, treating copper concentrate to produce matte, and a copper conversion process for obtaining blister copper from the matte. The process for producing matte is a process wherein by heating and melting the copper concentrate and oxidizing it by oxygen gas, the iron content in the copper concentrate is oxidized preferentially, producing a slag containing iron and silica as the main constituents, thereby removing the iron, while at the same time producing matte comprising $Cu_2S$. In the conversion process, the produced matte is further oxidized by oxygen gas, and the sulfur which is bonded to the copper is removed as $SO_2$, thereby obtaining blister copper. The blister copper obtained in this manner is then refined to electrolytic copper in an electrolytic refining process.

Pyrometallurgy is economical because blister copper is produced by promoting a spontaneous reaction using the oxidation energy of the sulfides of copper and iron. However, because the sulfur bonded to the copper or iron in the copper concentrate becomes $SO_2$ gas, it is generally recovered and rendered harmless in the form of sulfuric acid, although an environmental problem exists in that harmful $SO_2$ gas which cannot be recovered is released into the atmosphere.

Therefore recently, attention has been focused on wet processes which are not accompanied by the production of $SO_2$ gas. One such process is a hydrometallurgical process known as the SX-EW method, wherein copper can be recovered at low cost by leaching copper from low grade oxide ore or sulfide ore from which copper concentrate cannot be recovered economically, and subsequently using solvent extraction or electrowinning techniques.

In the case of low grade oxide ore, the majority of the leaching reaction is simple acid dissolution. In contrast, in the case of low grade sulfide ore, a solution containing sulfuric acid or ferric ions or the like is poured over an accumulated heap of copper ore, to leach the copper. In other words, sulfuric acid or ferric ions or the like are required for this leaching reaction, and managing the concentrations of the sulfuric acid or ferric ions appropriately is important in terms of the operation of each plant.

The reaction equations for the copper leaching reaction can be expressed as shown in equations 1 through 4, and it is apparent that ferric ions play a large role in the leaching of the copper.

$$CuFeS_2 + 2Fe_2(SO_4)_3 = CuSO_4 + 5FeSO_4 + 2S \qquad \text{Equation 1}$$

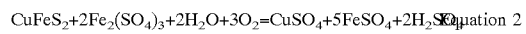

$$CuFeS_2 + 2Fe_2(SO_4)_3 + 2H_2O + 3O_2 = CuSO_4 + 5FeSO_4 + 2H_2SO_4 \qquad \text{Equation 2}$$

$$Cu_2S + H_2SO_4 + 1/2 O_2 = CuSO_4 + CuS + H_2O \qquad \text{Equation 3}$$

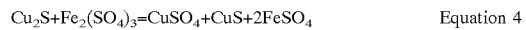

$$Cu_2S + Fe_2(SO_4)_3 = CuSO_4 + CuS + 2FeSO_4 \qquad \text{Equation 4}$$

The ferrous ions produced by these reactions are oxidized in air to reform ferric ions. These ferric ions are then reused in the leaching of copper.

In addition, if bacteria is involved in the copper ore within the accumulated heap, then sulfuric acid is produced by the bioactivity of the bacteria, and the oxidation of iron ions is accelerated, yielding a rapid improvement in the leaching kinetics. Accordingly, ideas for enhancing the oxidation to ferric ions and the activity of the bacteria, either by improving the way in which the copper ore accumulates, the shape of the heap or the watering method so that air can enter as easily as possible, or by using a blower to introduce air into the heap using a pipe, are currently being trialed.

However, the iron ions in the pregnant leach solution (PLS), which is leached from the copper ore and reused, becomes a hydroxide or a compound with another metal and becomes bound, and as such it is difficult to increase the ferric ion concentration above a certain concentration. As a result, a PLS with the type of high iron ion concentration ideal for leaching cannot be obtained, and to date a high copper leach rate has been unobtainable by heap leaching.

Furthermore, a compound containing ferric ions could be dissolved in the PLS used in the heap leaching in order to improve the copper leach rate, but because the use of reagents which increase the ferric ion concentration incur an increase in costs, this method is not applicable in actual practice.

In addition, the SX-EW method is conventionally used as a method effective in recovering copper from low grade copper ore which was otherwise difficult to process economically, but a long period of time is required to leach the copper. For example, generally one year is required to leach 50% of copper in the case of chalcocite, and approximately 5 years are required to leach more than 70%. Even more time is required for leaching in the case of chalcopyrite, which has poor solubility.

Due to the problems described above, the SX-EW method is normally applied to oxide ore or chalcocite ore. Accordingly, in a copper mine with chalcopyrite as the main mineral, concentrating of the economically viable high grade copper ore is performed to produce a copper concentrate, and a pyrometallurgical process is then performed at various smelteries, and the low grade copper ore considered to be economically non-viable has conventionally been left to accumulate as waste. From an economic point of view, on site smelting is preferred, predominantly due to the copper concentrate smelting costs and the costs of transporting the concentrate, but the use of a pyrometallurgical method near the copper mine is difficult to realize because of the large initial investment required, and because of environmental problems such as the production of $SO_2$ gas.

Accordingly, wet processes have been proposed in which on site smelting can be performed easily, and in which copper is leached by promoting an active chemical reaction. For example, a wet process has been proposed in which sulfide ore or copper concentrate or the like is leached at high temperature and high pressure to recover copper. In this wet process, an autoclave is used to leach copper concentrate at high temperatures, between 100° C. and 230° C. The leaching reaction is as shown in equations 5 and 6, and the copper concentrate is dissolved under pressurized oxygen or air (at an oxygen partial pressure of 0.1 to 2.0 MPa), allowing the copper leach rate to reach 90 to 99%. Because leaching is performed under conditions of high temperature and high pressure, the reaction is completed within 0.5 to 6 hours.

$$2CuFeS_2 + 17/2 O_2 + H_2SO_4 = 2CuSO_4 + Fe_2(SO_4)_3 + H_2O \quad \text{Equation 5}$$

$$2CuFeS_2 + 5/2 O_2 + 5H_2SO_4 = 2CuSO_4 + Fe_2(SO_4)_3 + 4S + 5H_2O \quad \text{Equation 6}$$

By careful control, it is possible to leach copper or iron or the like via the reaction in equation 6 without oxidizing the sulfur in the copper concentrate, but in practice, attempting to increase the copper leach rate results in the oxidation of 10 to 95% of the sulfur, and the reaction in equation 5 is considered to be predominant.

Accordingly, in the wet process, the sulfur within the copper concentrate is oxidized to sulfate ions, and sulfuric acid is produced. Consequently, the leachate cannot be processed as-is, and must be neutralized by a neutralizing agent such as limestone or sodium hydroxide before the copper recovery and refining processes are preformed. If the leachate is not neutralized, then when copper is recovered by solvent extraction, a large amount of copper remains in the solution, leading to a reduction in the copper recovery rate. In order to reduce the amount of neutralizing agent which is required, a process has been developed in which the oxidation of sulfur during leaching is kept to a minimum, and the sulfur is recovered in elemental sulfur form, but in this process, leaching must be performed under special conditions, such as the addition of chlorine ions during leaching, which is disadvantageous in terms of the corrosion resistance of the high temperature high pressure vessel based around an autoclave. In this manner, in order to recover copper economically from copper concentrate using a wet process, further improvement is necessary.

A process has also been proposed in which the copper leachate containing the sulfuric acid obtained in the wet process is mixed with the liquid used in the heap leaching process for low grade copper ore, thereby reducing the sulfuric acid concentration of the copper leachate, and the resulting product is then sent to the solvent extraction and electrowinning processes, which function as the processes for recovering copper in heap leaching, thereby obtaining copper (U.S. Pat. No. 5,698,170). This process is gathering attention as a new method for solving the above problems, in which copper can be recovered using existing plant facilities by simply diluting the copper leachate, without neutralizing the sulfuric acid in the copper leachate.

However, because the most suitable sulfuric acid concentration for copper recovery by means of solvent extraction is low, at 0.5 to 10 g/L, attempting to reduce the sulfuric acid concentration of a solution containing a high level of acid, such as the copper leachate, to a concentration within this range by dilution alone, means the mixing ratio of the solution to the heap leaching process solution is restricted. Furthermore, in plants which only produce a small amount of heap leaching process solution, it is impossible to leach a large amount of copper concentrate.

Furthermore, the only advantage of this method is that the sulfuric acid in the copper leachate can fulfill a supplementary role in the heap leaching process of copper ore, and this method requires lengthy leaching time and does not actively improve the leaching reaction in a heap leaching process with a low copper leach rate, and consequently does not have significant advantages.

SUMMERY OF THE INVENTION

An object of the present invention is to provide a method of recovering copper efficiently and economically from a material containing copper, which resolves the problems described above.

PREFERRED EMBODIMENTS OF THE INVENTION

In order to achieve this object, as a result of wide ranging investigation, the inventors of the present invention discovered that by leaching a material containing copper such as a copper concentrate, thereby obtaining a copper leachate containing ferric ions and sulfuric acid, and then sending this leachate to be reused in a heap leaching process for low grade copper ore provided in a separate location, the copper within the copper ore could be recovered more efficiently than in prior methods, and were hence able to complete the present invention.

In a method of recovering copper from copper ore according to the present invention, a copper concentrate obtained by flotation of a high grade copper ore containing chalcopyrite as a main mineral constituent is leached under high temperature and high pressure, and the thus obtained copper leachate containing ferric ions and sulfuric acid is used in heap leaching or vat leaching of a low grade copper ore. During leaching, the temperature is preferably at least 100° C., and the pressure is preferably greater than atmospheric pressure. Furthermore, the solution (copper leachate) used in the heap leaching or vat leaching preferably contains at least 5 g/L of ferric iron ions.

As follows is a more detailed description of the present invention with reference to specific examples.

Figure 1:
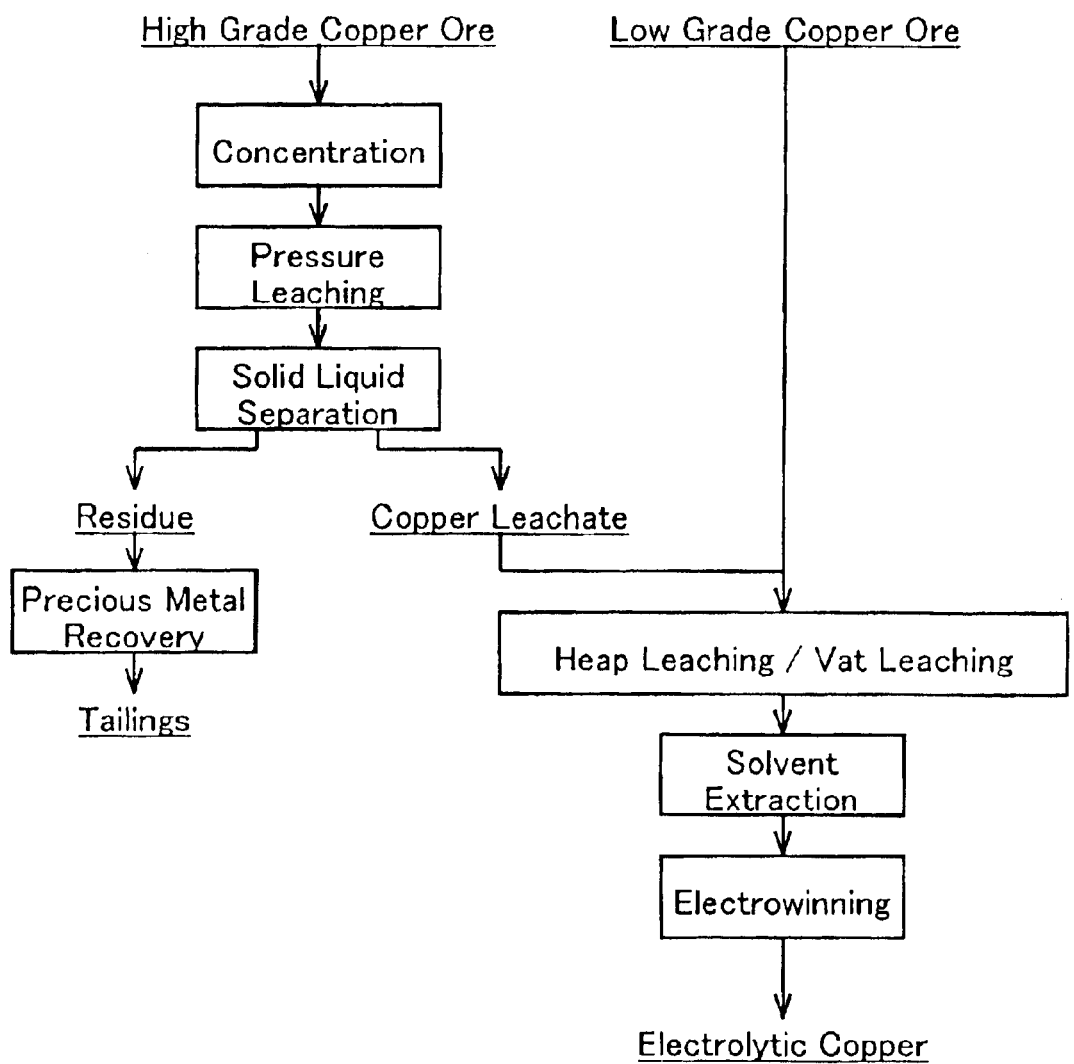
FIG. 1 A block diagram showing an example of a method of recovering copper from copper ore according to the present invention.

FIG. 1 is a block diagram showing an example of a method of recovering copper from copper ore according to the present invention.

As shown in FIG. 1, the method of recovering copper from copper ore according to the present invention simplifies and improves the efficiency of the concentrate leaching process and the low-grade ore process, by using the sulfuric acid and ferric ions contained in a copper leachate which has been leached under pressure from a high grade copper ore, in the heap leaching process of the low grade copper ore.

In the pressure leaching process for copper concentrate, copper concentrate containing 20 to 35% copper can be used. Because the copper concentrate is ground to a particle size of no more than 100 mm, and is produced at a pulp density of approximately 20% in the concentration process, it can either be used as-is, or after the pulp density has been adjusted, using either water or the barren solution from which copper has already been recovered. The density of the concentrate has no particular effect on the leaching reaction, but the pulp density of the copper concentrate is typically adjusted at of 10 to 200 g/L. This copper concentrate slurry is then sent to an autoclave. At this point, 1 to 100 g/L of sulfuric acid is added to the solution, and the copper concentrate is leached in the autoclave at a temperature of at least 100° C. and under a pressure greater than atmospheric pressure.

It is assumed that the leaching reaction proceeds according to the reaction equations shown in equations 7 and 8. The sulfur within the copper concentrate is oxidized to sulfate ions by air or oxygen. Furthermore, the iron within the copper concentrate is also leached.

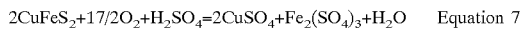

$$2CuFeS_2+17/2O_2+H_2SO_4=2CuSO_4+Fe_2(SO_4)_3+H_2O \quad \text{Equation 7}$$

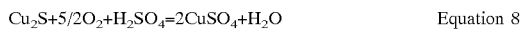

$$Cu_2S+5/2O_2+H_2SO_4=2CuSO_4+H_2O \quad \text{Equation 8}$$

As shown in Table 1, copper ore can be leached by performing pressure leaching (at an oxygen partial pressure of 0.5 MPa) under at a temperature of at least 100° C. Here, 65% or more opper and from 1 to 40% of the iron can be leached. Between 50 and 95% of the sulfur within the copper concentrate is oxidized and converted to sulfate ions.

TABLE 1

| Temperature (° C.) | Time (h) | Cu Leach Rate (%) | Fe Leach Rate (%) | S Oxidation Rate (%) |
|---|---|---|---|---|
| 110 | 1 | 65.3 | 1.0 | 54.2 |
| 150 | 1 | 92.5 | 35.4 | 74.6 |
| 200 | 1 | 93.9 | 14.3 | 88.7 |
| 220 | 0.5 | 97.2 | 28.9 | 93.0 |
| 220 | 1 | 98.9 | 1.0 | 93.1 |

The reaction progresses more quickly as the temperature rises, and copper is leached in a shorter period of time, but because the leached iron is congealed as $Fe_2O_3$, this reduces the quantity of ferric ions, which are beneficial to the leaching reaction in the heap leaching. Consequently, it is preferable that leaching is performed for a short period of time within a temperature range from 150 to 220° C., and as a result a copper leachate with an improved ferric ion concentration can be recovered.

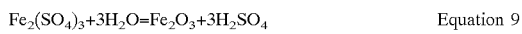

$$Fe_2(SO_4)_3+3H_2O=Fe_2O_3+3H_2SO_4 \quad \text{Equation 9}$$

The copper leachate is depressurized in a flash vessel to recover leach slurry and vapor. The residue of the leach slurry is then separated in a thickener, to obtain the copper leachate. The copper leachate contains Cu, Fe and $H_2SO_4$. The composition of the copper leachate differs according to the type of copper concentrate and the slurry density, but when copper concentrate with chalcopyrite as the main constituent, containing Cu: 26 wt %, Fe: 32 wt % and S: 38 wt %, is leached at a slurry density of 150 g/L, a copper leachate containing Cu: 38 g/L, Fe: 17 g/L and $H_2SO_4$: 67 g/L was obtained.

This copper leachate is then sent on to the leaching process for grade copper ore heap. The starting solution in heap leaching generally has a composition of Cu: 0.1 to 0.5 g/L and Fe: 2 to 4 g/L, but in the method of the present invention, this starting solution in heap leaching is mixed with the copper leachate obtained by pressure leaching of the copper concentrate, in order to improve the ferric ion and sulfuric acid concentrations. The mixed solution is applied to the heap of copper ore, and the copper is leached. Subsequently, solvent extraction and electrowinning are performed.

Figure 2:
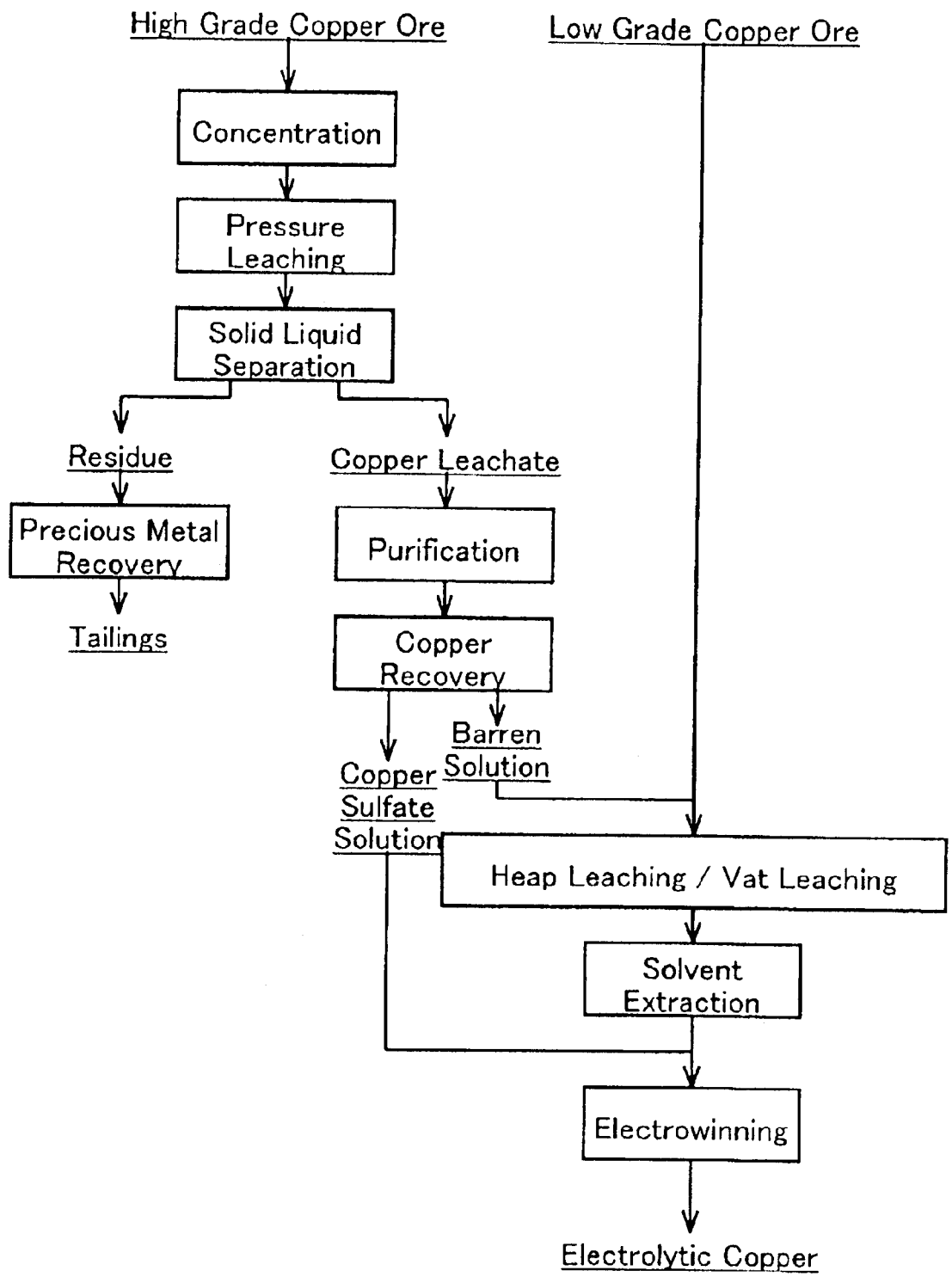
FIG. 2 A block diagram showing another example of a method of recovering copper from copper ore according to the present invention.

FIG. 2 shows a different example of a method of recovering copper from copper ore according to the present invention.

In this example, the majority of the copper is removed from the copper leachate, and subsequently, the sulfuric acid and the ferric ions remaining in the copper leachate (barren solution) are sent on to the ore heap leaching process.

In this case, prior to removing the majority of the copper, in the copper recovery process, purification is performed by means of a cementation reaction with using copper or iron metal to remove the impurities in the copper leachate. And subsequently, the copper leachate is separated into a copper sulfate solution containing a high concentration of copper, and a copper leachate (barren solution). The copper sulfate solution is then sent to the electrowinning process, where the copper is recovered by electrowinning.

Figure 3:
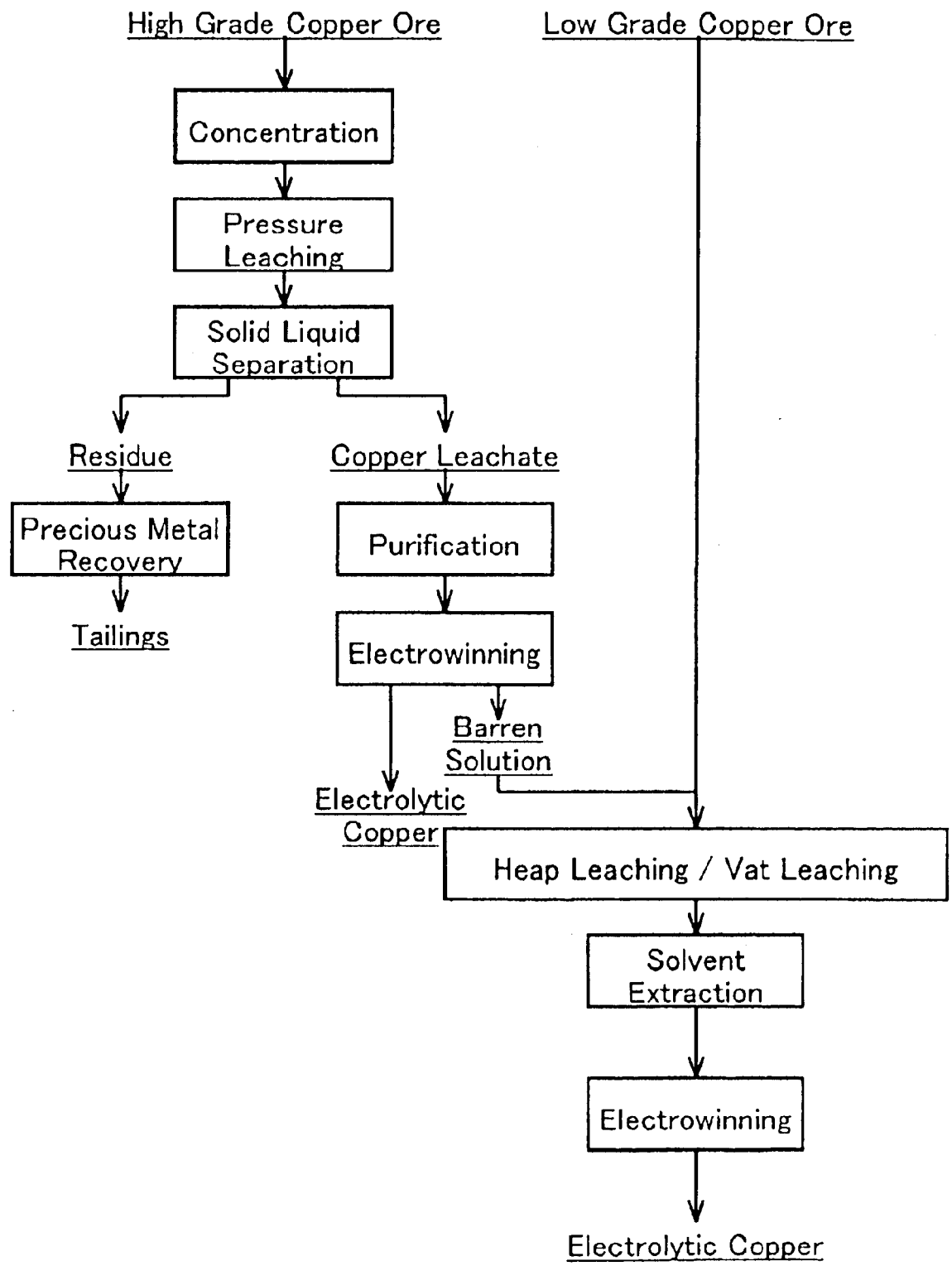
FIG. 3 A block diagram showing yet another example of a method of recovering copper from copper ore according to the present invention.

Furthermore, as shown in FIG. 3, it is possible to perform direct electrowinning of copper from the copper sulfate solution to separate the solution into electrolytic copper and a barren solution.

Figure 4:
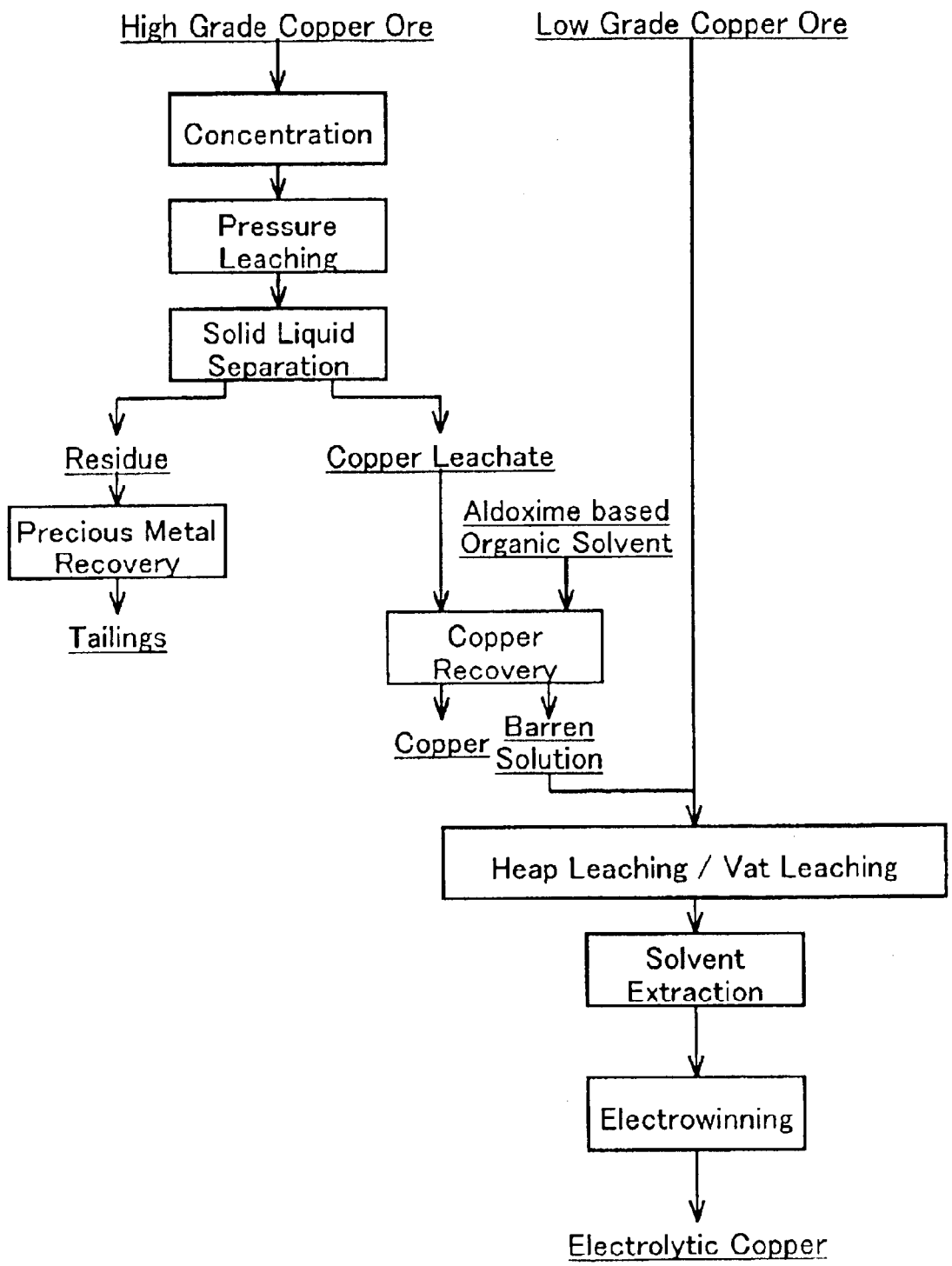
FIG. 4 A block diagram showing yet another example of a method of recovering copper from copper ore according to the present invention.

Alternatively, as shown in FIG. 4, the copper within the copper leachate can be extracted and recovered directly during the copper recovery process, by using an aldoxime based organic solvent, which is capable of extracting copper even from low pH solutions.

After separating the majority of the copper by these methods, the copper leachate (barren solution) can then be sent to the heap leaching process for low grade copper ore.

By reducing the copper concentration of the copper leachate used in the heap leaching, as in the present method, it is possible to further improve efficiency. The copper concentration of the pressure leachate is higher than that of the heap leaching solution. High copper contents reduces the copper recovery rate in the solvent extraction process. The extraction of the extraction agent is weak, and total extraction is difficult to achieve. So the efficiency can be improved by separating the majority of copper in advance, and then sending the barren solution to the heap leaching process to be used for recovering the remaining copper and promoting the leaching process.

As already described, the leaching reaction of copper sulfide ore is assumed to proceed according to the reaction equations in equations 1 to 4, in which the ferric ion concentration has a large effect. In the method of the present invention, by mixing the copper leachate, the copper leach rate and the rate of reaction can be improved in comparison with conventional heap leaching in which the iron concentration is low.

The results of leaching low grade copper ore (Cu: 0.4 wt %) in solutions with various ferric ion concentrations using thiobacillus ferrooxidans bacteria, are shown in Table 2.

As the ferric ion concentration increases, the copper leach rate increases. And comparing the case where only 32 to 35% of the copper can be leached in a 100 day period when leaching is performed with a solution with a conventional iron concentration, a high copper leach rate can be obtained in a short period of time by increasing the ferric ion concentration to at least 5 g/L. In this manner, in heap leaching of copper ore, the ferric ion concentration is preferably increased to higher levels than in conventional methods, and is preferably raised to at least 5 g/L.

TABLE 2

| $Fe^{3+}$ Concentration (g/L) | Time (days) | Cu Leach Rate (%) |
|---|---|---|
| 0 | 100 | 32 |
|  | 200 | 51 |
| 3 | 100 | 35 |

TABLE 2-continued

| $Fe^{3+}$ Concentration (g/L) | Time (days) | Cu Leach Rate (%) |
|---|---|---|
| 5 | 100 | 62 |
|  | 200 | 99 |
| 7 | 100 | 65 |

The mixing ratio of the heap leaching process solution to the solution in the copper ore leaching process cannot be specified, because the composition of the copper leachate differs according to the copper concentrate leaching conditions such as the composition of the concentrate and the slurry density. But the copper leachate should be mixed with the heap leaching process solution so that an advantageous ferric ion concentration of at least 5 g/L is maintained for the copper ore heap leaching. Furthermore, sulfuric acid is also required in the leaching of copper ore, but sulfuric acid is contained in the copper leachate, and this sulfuric acid can be used in the leaching reaction, in addition to the ferric ions. Accordingly, by mixing the copper leachate, it is no longer necessary to supply supplementary sulfuric acid.

Copper can be metallated from the copper ore heap leaching leachate and subsequently made into products by conventional separation and recovery techniques (separation of the copper by solvent extraction, and subsequent back extraction of copper from the organic phase by means of electrolytic waste, and further recovery of copper from the back extraction solution by electrolysis). The raffinate (the copper leachate from which the copper has been separated by solvent extraction) is then reused in the heap leaching process, although a portion of this solution is used when converting the copper concentrate to a slurry.

As described above, according to a method of the present invention, by mixing a copper leachate containing copper ions, iron ions and sulfuric acid, which is produced through the leaching of a high grade copper ore, with a solution used in the leaching process for a low grade copper ore, copper can be recovered efficiently and economically.

What is claimed is:

1. A method of recovering copper from copper containing ore comprising
   a[ obtaining a copper concentrate by flotation of a high grade copper ore containing chalcopyrite as a main mineral constituent;
   b) leaching the concentrate from step a) with sulfuric acid at elevated temperature and pressure;
   c) separating the ferric ion and sulfuric acid containing leachate from the residue of step b);
   d) heap or vat leaching low grade copper ore with the leachate of step c); and
   e) recovering copper from the leachate of step d).

2. A method of recovering copper from copper ore according to claim 1, wherein a solution used in said heap leaching or vat leaching contains at least 5 g/L of iron ions.

3. A method of recovering copper from copper ore according to claim 1, wherein said leaching is performed at a temperature of at least 100° C. and under a pressure higher than atmospheric pressure.

4. A method of recovering copper from copper ore according to claim 3, wherein said temperature is within a range from 150 to 220° C., and an oxygen partial pressure is within a range from 0.1 to 2.0 MPa.

5. The method of claim 1 where the copper concentration in copper concentrate of step 1 is in the range of from about 20 to about 35%.

6. The method of claim 1 where the copper concentrate is ground to a particle size of no more than 100 mm.

7. The method of claim 1 where the pulp density of the copper concentrate is in the range of 10 to 200 g/l.

8. A method of recovering copper from copper ore according to claim 2, wherein said leaching is performed at a temperature of at least 100° C. and under a pressure higher than atmospheric pressure.

9. The method of claim 1 where the copper leachate from step b) is purified by cementation and the resulting leachate from the purification step is separated into a copper sulfate solution and a low copper containing leachate.

* * * * *